United States Patent [19]

Bolyard

[11] Patent Number: 5,720,878

[45] Date of Patent: Feb. 24, 1998

[54] PANEL FILTER SYSTEM

[75] Inventor: Frank K. Bolyard, Edgefield, S.C.

[73] Assignee: Chem-Nuclear Systems, Inc., Columbia, S.C.

[21] Appl. No.: 612,250

[22] Filed: Mar. 7, 1996

[51] Int. Cl.$^6$ .................................... B01D 29/15
[52] U.S. Cl. .................... 210/337; 210/342; 210/346; 210/487
[58] Field of Search .................... 210/346, 486, 210/487, 497.01, 323.1, 337, 342

[56] References Cited

U.S. PATENT DOCUMENTS

| | | |
|---|---|---|
| 1,940,208 | 12/1933 | Dieman . |
| 3,481,479 | 12/1969 | Hoskins et al. . |
| 3,486,627 | 12/1969 | Ashby et al. . |
| 3,542,206 | 11/1970 | Geister . |
| 3,659,718 | 5/1972 | Brociner et al. . |
| 4,022,695 | 5/1977 | Howard et al. . |
| 4,057,501 | 11/1977 | Müller . |
| 4,240,864 | 12/1980 | Lin . |
| 4,312,753 | 1/1982 | Bell . |
| 4,968,423 | 11/1990 | McKale et al. ................ 210/346 |
| 5,057,217 | 10/1991 | Lutz et al. . |

*Primary Examiner*—W. L. Walker
*Attorney, Agent, or Firm*—McDonnell Boehnen Hulbert & Berghoff

[57] ABSTRACT

A panel filter for filtering waste media comprises at least two stacked filtering medium sheets. Each sheet is shaped to have two substantially identically-shaped portions integrally interconnected along an intermediate portion thereof. The stack of filtering medium sheets is folded over upon itself along the intermediate portions of the filtering medium sheets to create an inner central cavity of said stack and mating marginal edges that are secured and sealed together to form an outlet opening at a point along the marginal edges. A filtration conduit is received in the outlet opening of the panel filter and communicates with the inner central cavity of the panel filter.

27 Claims, 4 Drawing Sheets

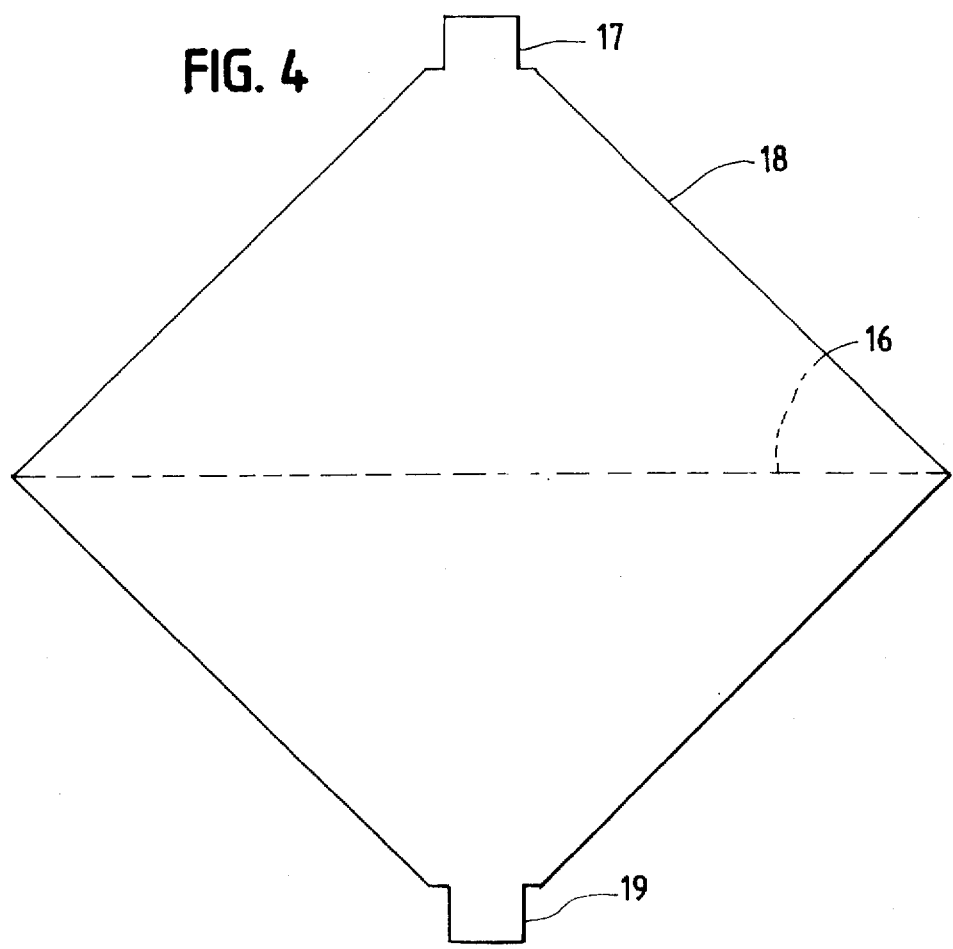
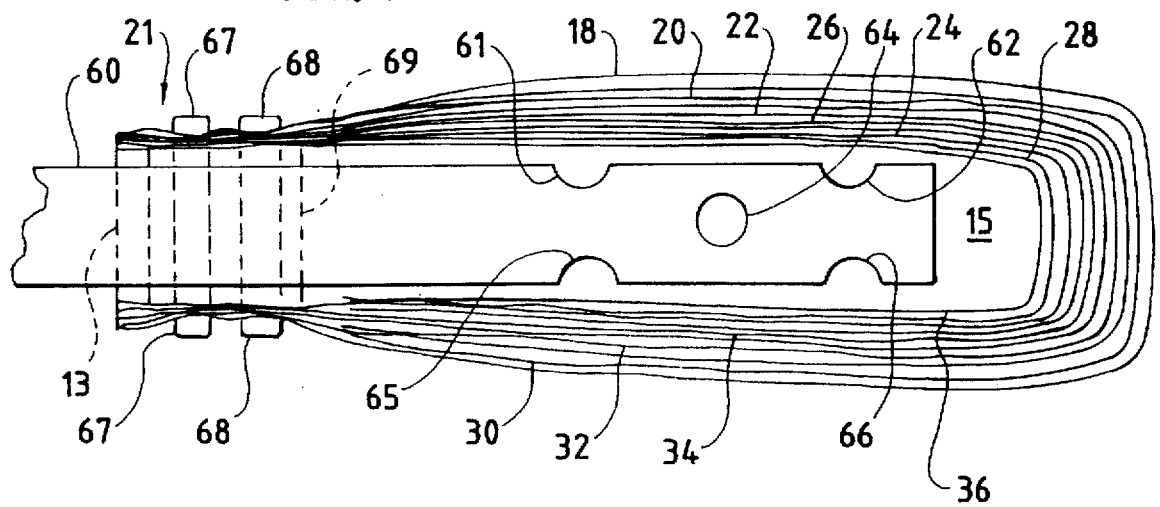

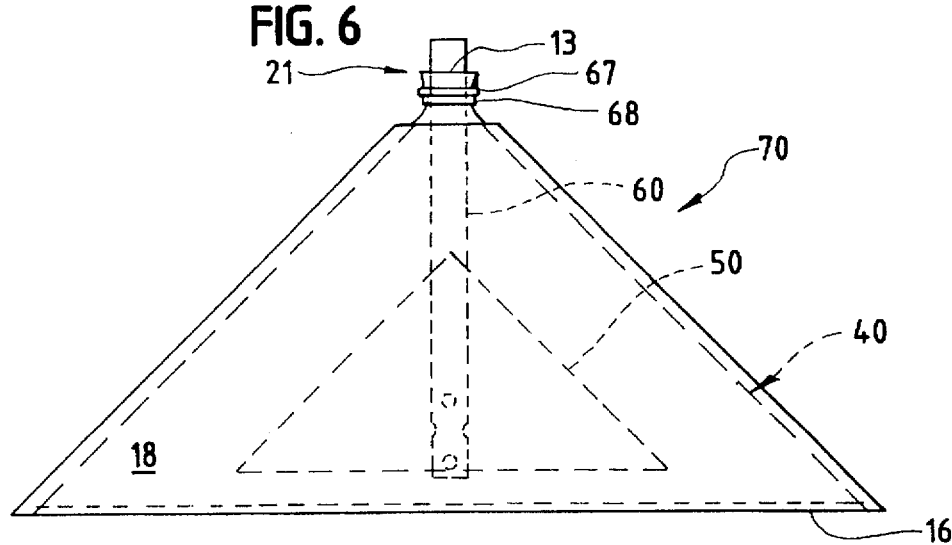
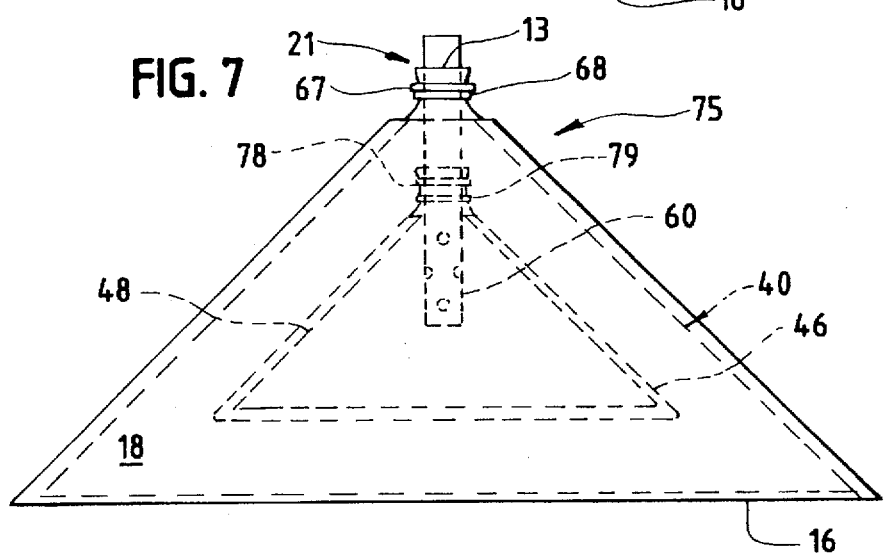
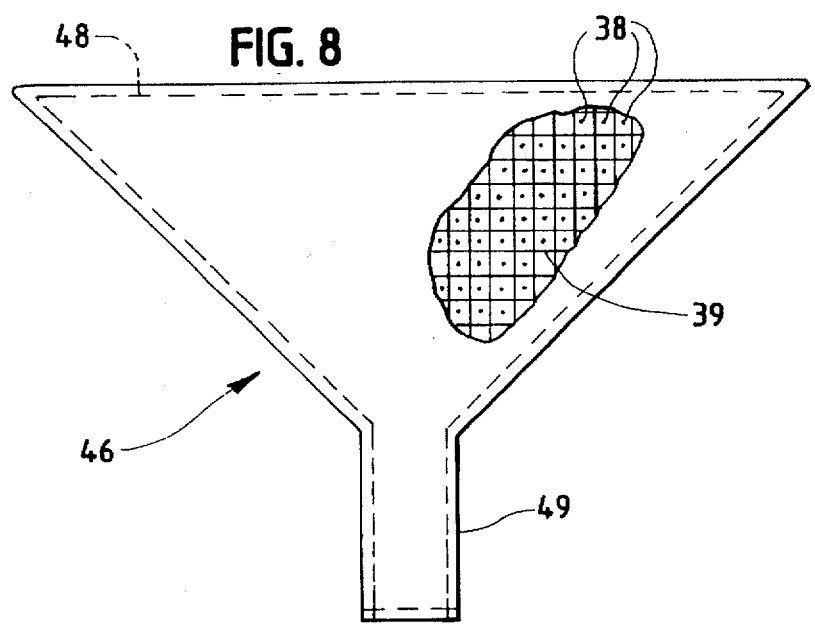

PANEL FILTER SYSTEM

BACKGROUND OF THE INVENTION

The present invention relates to panel filters. More particularly, the present invention relates to panel filter assemblies for use in filtering a slurry of waste or other media.

Waste media, for example, is typically stored in large tanks. Filtration of the waste media is accomplished through the use of a plurality of filters disposed at the bottom of the tank and interconnected to an effluent discharge network that operates in a vacuum service capacity. Alternatively, an effluent discharge network and filter configuration may operate in a reverse-flow capacity for this and other types of applications. Filters that have been used in the vacuum service application to filter waste media include circular polypropylene filters that are constructed from strands of poly fibers which are spun to create a predetermined radial density gradient. The manner for manufacturing such spun filters is described, for example, by U.S. Pat. No. 4,240,864. Although such filters can provide for adequate filtration, they are rigid and often less flexible than the tank bottoms and, as a result, can be damaged when a loaded tank is being moved or otherwise handled. Moreover, such filters cannot be readily generated to meet the special needs of a particular filtration application. Rather, a filter having unique filtration characteristics must be specially spun to provide the appropriate density gradient.

SUMMARY OF THE INVENTION

The present invention relates to a panel filter for filtering a slurry of waste or other media. The panel filter of the present invention comprises at least two stacked filtering medium sheets. Each sheet is shaped in a pattern having two substantially identically-shaped portions integrally interconnected along an intermediate portion thereof. Each sheet may also have a filtration characteristic that differentiates the sheet from other sheets in the stack. The stack of filtering medium sheets is folded over upon itself along the intermediate portions of the filtering medium sheets to create an inner central cavity of said stack. The folded stack also forms mating marginal edges that are secured and sealed together to form an outlet opening along a portion of the marginal edges. A filtration conduit is received in the outlet opening of the panel filter and communicates with the inner central cavity of the panel filter. The panel filter of the present invention provides for more cost-efficient and reliable filtration. Filtration surface area is optimized in a flexible, low profile assembly that is easily customized to meet the specific needs of a particular application, including air and fluid service.

It is therefore an object of the present invention to provide a panel filter assembly that is reliable, flexible, easily customized, disposable, low in profile, and otherwise cost-efficient. Other objects and advantages of the present invention will be apparent to those of skill in the art from the description of the preferred embodiment that follows.

BRIEF DESCRIPTION OF THE DRAWING

A preferred embodiment of the present invention is described herein with reference to the drawing wherein:

FIG. 4 is an unfolded panel filter layer in accordance with one embodiment of the present invention;

FIG. 5 is a cross-sectional side view of the panel filter assembly shown in FIG. 1;

FIG. 6 illustrates a second embodiment of the panel filter assembly of the present invention including a baffle;

FIG. 7 illustrates a third embodiment of the panel filter assembly of the present invention including a bag or compartment; and FIG. 8 is an illustration of an ionic filtration bag or compartment.

DESCRIPTION OF THE PREFERRED EMBODIMENT

The preferred embodiment of the present invention is shown in the Figures. The preferred embodiment is a flat panel filter assembly 10 that is used in a vacuum service dewatering application, and, in particular, a nuclear waste media dewatering application. Possible applications for the preferred filter assembly 10 involve fluid and gas (air) transfer through the filter assembly 10. The assembly 10 performs two functions in either application: (1) filtration and (2) wicking or water and moisture gathering. Although the particular application described herein is a vacuum service application, it will be understood that the panel filter assembly of the present invention may alternatively be used in reverse-flow applications without departing from the true spirit and scope of the present invention.

Figure 2:
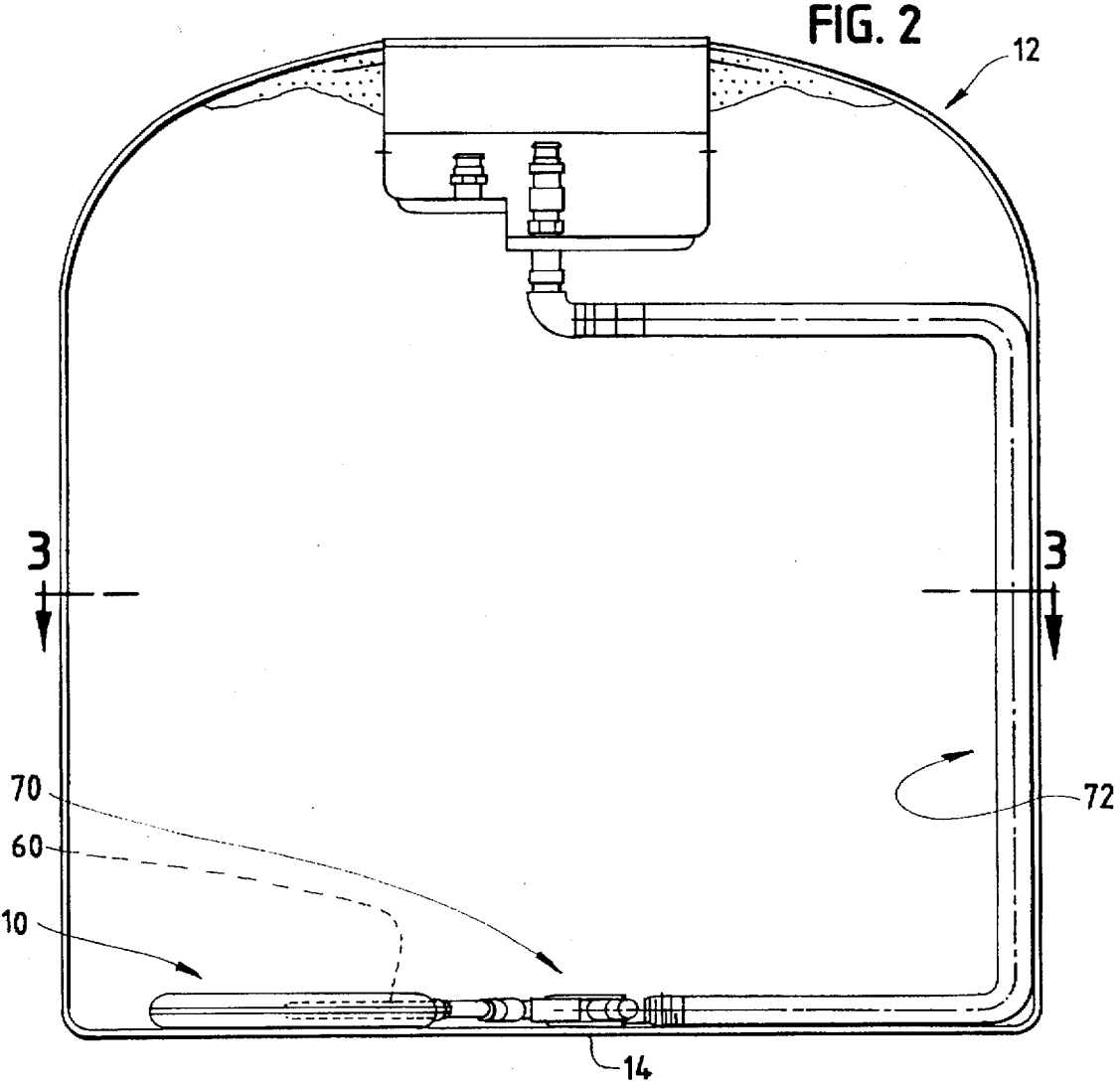
FIG. 2 shows a side cut-away view of a resin dewatering liner or tank having four panel filter assemblies of the present invention disposed along the tank bottom.
Figure 3:
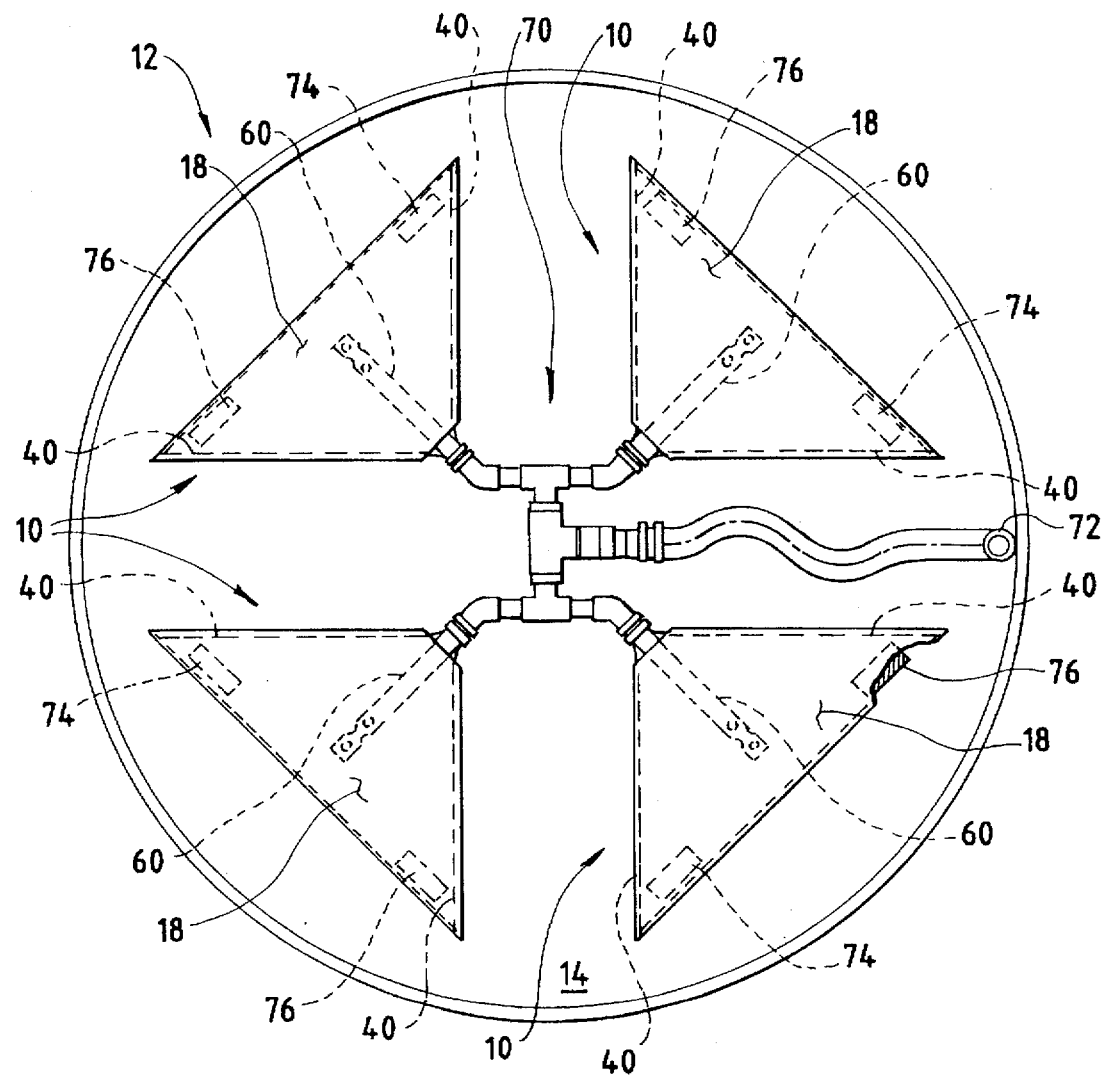
FIG. 3 is a bottom view of the tank shown in FIG. 2, wherein one panel filter assembly of the present invention is disposed in each quadrant of the tank bottom.

As shown in FIGS. 2 and 3, four panel filters 10 are positioned at the bottom of a resin dewatering tank 12 so as to each occupy one quadrant of the tank bottom 14. Tanks of the sort shown in the Figures can be of various types and sizes, including 6–80 through 14–215 and 21–300 sizes for example. The tank 12 can be constructed from various types of materials, and may include HIC ("High Integrity Container") and steel type tanks.

A complete filter assembly 10 preferably has a substantially right-angled triangular shape, wherein the hypotenuse of the triangular shape is approximately 34 inches. It will be readily apparent to those persons of skill in the art, however, that alternative filter geometries and sizes may be used as desired without departing from the spirit and scope of the present invention.

The preferred filter assembly 10 is constructed from at least one sheet or layer of synthetic or natural porous microfiber material 18, such as for example a polypropylene or nylon filter material composite. The specific filtration requirements of the application typically dictate the selection of a suitable sheet material. Filter sheet 18 is preferably cut in a shape that permits the sheet to be folded over upon itself in a symmetrical fashion to create a double-sided compartment or inner central cavity 15. An unfolded filter sheet or layer 18 is shown for example in FIG. 4. Once cut, the sheet 18 is folded over upon itself along fold line 16 so that opposing corners 17 and 19 of the sheet 18 align.

Figure 1:
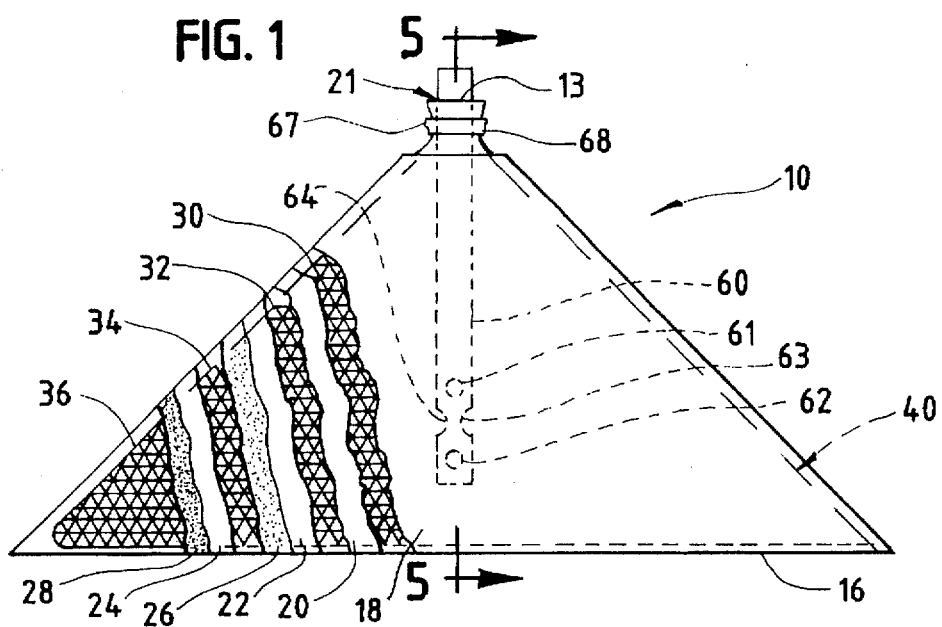
FIG. 1 illustrates a cut-away view of one embodiment of the panel filter assembly of the present invention.

Multiple layering of similarly-fashioned filter sheets, such as sheets 18, 20, 22, and 24 for example as shown in FIG. 1, prior to folding provides a symmetrical panel filter assembly 10 having multiple filtration layers. In this way, the sheet layers 18 and 24 at the outer ends of the stack of filter sheets becomes, after folding, the outermost and innermost filtration layers of the assembly 10, respectively.

Varying the particular characteristics of the sheet materials from one layer to another allows the filter assembly 10 to be customized to suit the needs (e.g., required skew characteristics) of a particular application.

Indeed, the preferred sheet materials 18, 20, 22, and 24 that form the respective filtration layers are of a sufficient thickness to provide an adequate tortuous path to accomplish the intended filtration for a given filter layer. Sheet materials 18, 20, 22, and 24 are also chosen to have optimum hydroelastic properties. The material in each successive sheet towards the interior of the filter assembly 10 preferably decreases in thickness, or pore size, to optimize performance relative to space requirements.

If the selected filter material 18, 20, 22, or 24 is not inherently course enough to provide a sufficient amount of liquid flow through the filter assembly 10, a mechanical spacer means may be incorporated into the filter assembly 10 to facilitate such flow. The preferred filter assembly 10, for example, includes an alternating configuration of filtering layers 18, 20, 22, and 24 and crush-resistant bracing or drainage layers 30, 32, 34, and 36, as is best shown for example in FIGS. 1 and 5. The drainage layers 30, 32, 34, and 36, which are preferably constructed from relatively flexible sheet materials, facilitate the flow of liquid through the filter assembly 10 by maximizing the active surface areas of adjacent filter layers 18, 20, 22, and 24.

Once layered as desired and folded over, the various panels 18, 20, 22, and 24 of the preferred filter assembly 10 are both sealed and double stitched together at the marginal edges of the panels 40. Melt bonding, adhesives, or other similar methods may be used to help ensure that unwanted particles are not carried into the filter interior as a result of leakage from one layer to another. Similarly, the seams are preferably sealed to prevent leakage at the interface of the filter exterior and the medium to be filtered. The layers of drainage layers 30, 32, 34, and 36 are preferably sized smaller than the filter layers 18, 20, 22, and 24 so as to be excluded from the marginal edge stitching to help ensure that no unwanted leaks result at the seam from the presence of the interspersed porous drainage layers 30, 32, 34, and 36.

The present invention may provide up to at least three filtration processes that may be used simultaneously in a given panel filter assembly; mechanical filtration, micro filtration, and ionic capture. Mechanical filtration, for example, removes relatively large particles of foreign material in a conventional manner. The porous membranes 18, 20, 22, and 24 are preferably layered to provide progressively higher density filtration layers as the media being filtered passes through towards the inner central cavity 15 of the assembly 10.

The specific sheet materials used for filtration layers 18, 20, 22, and 24 are preferably selected to minimize inactive surface area and to maximize hydrophobic characteristics for improved water gathering capability during the air or gas medium application. During the air flow phase, the hydrophobic quality of the assembly 10 results in vaporizing the water and moisture when the moisture entrained air flows past the material. This improves the moisture gathering performance of the filter assembly 10 and thereby improves performance of the process equipment providing the motive force to dewater or dry the particulate media adjacent to the filter 10. The lack of affinity for water, displayed by the filter assembly 10, results in rapid drying of each filter layer 18, 20, 22, and 24 and any adjacent material in close proximity to the filter assembly 10. Porous media adjacent to the assembly 10 is dried through a wicking action, by migration of water from a more wet area to a more dry area.

A second filtration process that may be incorporated into a given filter assembly of the present invention is micromechanical filtration. Micro filtration may be accomplished, for example, by an optional layer 26 of carbon impregnated sheet, having carbon or similar material such as zeolites captured between two layers of membrane. In this way a porous carbon sheet 26 that is positioned toward the interior of panel filter assembly 10 may provide final microfiltration. The fine carbon mesh captured within the fibers of the material matrix contains micro pores to capture very fine particles. The carbon may also capture charged particles by electrostatic attraction. The entire filter assembly 10 is preferably fabricated from non-metallic components which are chosen to be electrical insulators to enhance this process. An electrical charge from an external source may also be applied to the electrically conductive carbon layer to enhance ionic and electrostatic capture. The charge may be applied, for example, through an electrical wire with external insulation, connected to the carbon sheet and exiting the container and connecting to appropriate process equipment.

Ionic capture filtration may also be incorporated into a given filter assembly of the present invention through the use of a layer of filtration material 28 that contains a matrix of ion exchange resin beads 38 and/or microporous resins or equivalent materials. This ionic filtration layer 26 is preferably inserted between filtration layer 24 and drainage layer 36. The resin beads 38, which are preferably in the 60–80 mesh range, may be dispersed and affixed onto sheets and formed into a membrane layer or captured between a grid 39 and a porous sheet attached together to immobilize the beads. These resins are available in a variety of configurations for specific ion capture by ion exchange and/or electrostatic charge, and may be customized to remove nuclear corrosion products and radionuclei specific to certain streams. The beads 38 are charged with positive ions where the molecule or ion to be captured has a negative charge, or visa versa. When the ion comes into contact with the charged bead, the ion is captured by the bead and prevented from flowing past into the effluent.

While in FIGS. 1 and 5 the ionic filtration layer 28 and microfiltration layer 26 are layered and folded along with the other filtration and drainage layers of the assembly 10, ionic filtration, microfiltration, or both, may alternatively be realized through the use of a bag 46 that is constructed from, for example, a carbon impregnated cloth material and/or a membrane having immobilized resin beads. In this embodiment, two piles of material are cut and sewn together at their marginal edges 48 to create a triangular-shaped receptacle having a neck portion 49 to receive the pipe manifold 60. An ionic filtration bag 46, which is constructed from a grid 39 and a porous sheet material that together immobilize resin beads 38, is shown for example in FIG. 8.

The filter effluent discharge is collected by the pipe manifold 60 which runs centrally into the interior central cavity 15 of the filter 10, as shown for example in FIG. 1. The pipe manifold 60 is constructed from a PVC material and includes six staggered and symmetrical apertures 61–66 at one end to receive filtered fluid. In this way the filtered medium is withdrawn from the filter assembly 10 through the pipe manifold 60. The manifold 60 is non-collapsible at greater than 28' Hg vacuum.

A baffle 50 may be used, as is shown for example in the embodiment 70 shown in FIG. 6, to provide an improved, laminar flow within the filter assembly 10 during the air phase. The baffle 50 is preferably constructed in a triangular shape from a non-porous poly sheet material of approximately 0.10 millimeter thickness. The baffle 50 is preferably positioned adjacent apertures 61–66, and between drainage member 36 and filtration layer 24 such that baffle 50 is disposed over the pipe manifold 60 as the assembly 10 is positioned within the tank 12. The tank bottom 14 operates from below the pipe manifold 60 to improve laminar flow.

The intermits drainage member 36, near the effluent pipe manifold 60, is selected to have a high degree of loft or thickness to assure uniform distribution of fluid or air during the final filtration phase, and to be non-collapsible under vacuum conditions. The drainage member 36 is much larger than in conventional fluid filters because of optimum performance needed during the air phase.

The various layers of filter material 18, 20, 22, and 24, without the drainage layers 30, 32, 34, and 36, are also preferably cut at opposing ends, like corners 17 and 19 of sheet 18 for example, to produce a multi-layered collar 21 to form an outlet opening 13 for receipt of the pipe manifold 60. As is best shown for example in FIG. 5, a pliable rubber sleeve or gasket 69 is fitted onto the pipe manifold 60 to form a water proof seal. The filter collar 21 is sewn in a glue emulsion or otherwise secured to the sleeve 69. Plastic straps 67 and 68 or other mechanical clamps, for example, may be used for this purpose. The interface thus formed between the pipe manifold 60 and the filter collar 21 provides elasticity to help ensure that a positive seal is maintained during flex conditions of the filter assembly 10. The ionic or micro filtration bag 46 is preferably sealed around the pipe manifold in a similar manner, using a pliable rubber sleeve (not shown) and straps 78 and 79.

The pipe manifold 60 of each filter assembly 10 is, in turn, connected in a conventional manner to the remaining effluent discharge network. A preferred filter hub 70 and riser system 72 is shown for example in FIGS. 2 and 3. The various component parts of the filter hub 70 and riser system 72 are preferably constructed from hose and/or standard PVC material. In this way the preferred hub and riser system design, like the panel filter assembly design, performs adequately when exposed to lower ambient temperatures, and remains relatively flexible to minimize damage that may be experienced during handling, off-load and storage.

The panel filter assembly 10 of the present invention may be used in various positions relative to the tank 12 and to the filtered to be filtered, including but not limited to horizontal or vertical placement within the fluid to be filtered. The filter 10 may alternatively float on the surface of the medium. Many typical dewatering applications, including the application of the preferred embodiment, call for placement of the filters 10 on the bottom of the tank. In such applications, adhesive, cloth latch/hook arrangements, or other securing means may be used to secure the panel filter 10 to the tank 12 so as to prevent the panel filter 10 from floating when the tank 12 is filled. The preferred filter 10 uses adhesive regions 74 and 76 that are stitched and sealed to a bottom side of the outer panel layer 18 for this purpose.

Once used, the preferred filter assembly 10 may be easily disposed of through incineration, for example. The absence of metal components and the resulting substantial reduction in volume makes incineration a particularly attractive means of disposal.

Although certain embodiments of the invention have been described and illustrated herein, it will be readily apparent to those of ordinary skill in the art that a number of modifications and substitutions can be made to the panel filter system disclosed and described herein without departing from the true spirit and scope of the invention.

I claim:

1. A panel filter for filtering a slurry, comprising at least two stacked filtering medium sheets each having a pattern of two substantially identically-shaped portions integrally interconnected along an intermediate portion thereof, said stack of filtering medium sheets being folded over upon itself along said intermediate portions of said filtering medium sheets to create an inner central cavity of said stack and mating marginal edges secured and sealed together to form an outlet opening in said mating marginal edges to sealingly receive a conduit which communicates with said inner central cavity of said panel filter.

2. A panel filter as set forth in claim 1, wherein said filtering medium sheets each have at least one filtration characteristic that is different from filtration characteristics of other filtering medium sheets in said stack, and wherein at least one of said filtering medium sheets provides a mechanical filtration layer of said panel filter.

3. A panel filter as set forth in claim 2, wherein at least one of said filtering medium sheets provides a microfiltration layer of said panel filter.

4. A panel filter as set forth in claim 2, wherein at least one of said filtering medium sheets provides an ionic capture filtration layer of said panel filter.

5. A panel filter as set forth in claim 2, wherein at least one of said filtering medium sheets provides a microfiltration layer for said panel filter, and wherein at least one of said filtering medium sheets provides an ionic capture filtration layer for said panel filter.

6. A panel filter as set forth in claim 2, further comprising at least one drainage medium sheet interspersed between individual filtering medium sheets of said stack of filtering medium sheets.

7. A panel filter as set forth in claim 6, wherein said drainage member sheet has a pattern of two substantially identically-shaped portions integrally interconnected along an intermediate portion thereof, said pattern of said drainage member sheet corresponding substantially to said pattern of said filtering medium sheets.

8. A panel filter as set forth in claim 1, wherein said filtering medium sheets each have a substantially square shape to provide a pattern of two substantially identically-shaped triangular portions integrally interconnected along an intermediate portion thereof extending between first and second opposing corners of said filtering medium sheet, and wherein said outlet opening is formed at third and fourth opposing and mated corners of said filtering medium sheets.

9. A panel filter as set forth in claim 8, further comprising at least one drainage medium sheet interspersed between individual filtering medium sheets of said stack of filtering medium sheets, said drainage member sheet having a substantially square shape to provide a pattern of two substantially identically-shaped triangular portions integrally interconnected along an intermediate portion thereof extending between first and second opposing corners of said filtering medium sheet.

10. A panel filter as set forth in claim 1, further comprising a baffle disposed adjacent said inner central cavity of said panel filter to improve laminar flow within said panel filter.

11. A panel filter as set forth in claim 1, further comprising securing means for securing the panel filter to an interior surface of a tank that stores said slurry.

12. A panel filter assembly for filtering a slurry, comprising:

at least two stacked filtering medium sheets each having a pattern of two substantially identically-shaped portions integrally interconnected along an intermediate portion thereof, said stack of filtering medium sheets being folded over upon itself along said intermediate portions of said filtering medium sheets to create an inner central cavity of said stack and mating marginal edges secured and sealed together to form an outlet opening in said mating marginal edges;

a conduit that is received in said outlet opening and which communicates with said inner central cavity of said panel filter; and a pliable sleeve sealably extending around a circumference of said conduit, said outlet opening being secured and sealed to said sleeve.

13. A panel filter assembly as set forth in claim 12, wherein said outlet opening is secured and sealed to said sleeve with stitches disposed in a glue emulsion.

14. A panel filter assembly as set forth in claim 12, further comprising at least one drainage medium sheet interspersed between individual filtering medium sheets of said stack of filtering medium sheets.

15. A panel filter assembly as set forth in claim 12, wherein said drainage member sheet has a pattern of two substantially identically-shaped portions integrally interconnected along an intermediate portion thereof, said pattern of said drainage member sheet corresponding substantially to said pattern of said filtering medium sheets.

16. A panel filter assembly as set forth in claim 12, wherein said filtering medium sheets each have a substantially square shape to provide a pattern of two substantially identically-shaped triangular portions integrally interconnected along an intermediate portion thereof extending between first and second opposing corners of said filtering medium sheet, and wherein said outlet opening is formed at third and fourth opposing and mated corners of said filtering medium sheets.

17. A panel filter assembly as set forth in claim 16, further comprising at least one drainage medium sheet interspersed between individual filtering medium sheets of said stack of filtering medium sheets, said drainage member sheet having a substantially square shape to provide a pattern of two substantially identically-shaped triangular portions integrally interconnected along an intermediate portion thereof extending between first and second opposing corners of said drainage medium sheet.

18. A panel filter assembly as set forth in claim 12, wherein said conduit comprises a pipe manifold that is received in said outlet opening and extends into said central inner central cavity of said panel filter, said pipe manifold having a plurality of apertures to provide communication between said inner central cavity of said panel filter and an interior hollow length of said pipe manifold.

19. A panel filter as set forth in claim 12, further comprising a baffle disposed adjacent said inner central cavity of said panel filter to improve laminar flow within said panel filter.

20. A panel filter as set forth in claim 12, further comprising securing means for securing the panel filter to an interior surface of a tank that stores said slurry.

21. A panel filter as set forth in claim 12, wherein at least one of said filtering medium sheets provides a microfiltration layer of said panel filter.

22. A panel filter as set forth in claim 12, wherein at least one of said filtering medium sheets provides an ionic capture filtration layer of said panel filter.

23. A panel filter as set forth in claim 12, wherein at least one of said filtering medium sheets provides a microfiltration layer for said panel filter, and wherein at least one of said filtering medium sheets provides an ionic capture filtration layer for said panel filter.

24. A panel filter as set forth in claim 18, further comprising a bag formed from filtration sheet material that is disposed in said inner central region of said panel filter and into which said pipe manifold is further received.

25. A panel filter as set forth in claim 24, wherein said bag provides a microfiltration layer of said panel filter.

26. A panel filter as set forth in claim 24, wherein said bag provides an ionic capture filtration layer of said panel filter.

27. A panel filter assembly for filtering a slurry, comprising:

at least two stacked filtering medium sheets each having at least one filtration characteristic that is different from filtration characteristics of other filtering medium sheets in said stack, and each filtering medium sheet having a substantially square shape to provide a pattern of two substantially identically-shaped triangular portions integrally interconnected along an intermediate portion thereof extending between first and second opposing corners of said filtering medium sheet, said stack of filtering medium sheets being folded over upon itself along said intermediate portions of said filtering medium sheets to create an inner central cavity of said stack and mating marginal edges secured and sealed together to form an outlet opening at third and fourth opposing and mated corners of said filtering medium sheets;

at least one drainage medium sheet interspersed between individual filtering medium sheets of said stack of filtering medium sheets, said drainage member sheet having a substantially square shape to provide a pattern of two substantially identically-shaped triangular portions integrally interconnected along an intermediate portion thereof extending between first and second opposing corners of said drainage medium sheet;

a pipe manifold that is received in said outlet opening and extends into said central inner central cavity of said panel filter, said pipe manifold having a plurality of apertures to provide communication between said inner central cavity of said panel filter and an interior hollow length of said pipe manifold;

a baffle disposed adjacent said inner central cavity of said panel filter to improve laminar flow within said panel filter;

a pliable sleeve sealably extending around a circumference of said pipe manifold, said outlet opening being secured and sealed to said sleeve with stitches disposed in a glue emulsion and further with mechanical clamps; and securing means for securing the panel filter to an interior surface of a tank that stores said slurry.

* * * * *